United States Patent [19]

Neidecker

[11] 3,980,387
[45] Sept. 14, 1976

[54] SNAP-TYPE CONNECTOR FOR BATTERY TERMINAL

[75] Inventor: Rudolf Neidecker, Basel, Switzerland

[73] Assignee: Multi-Contact A.G., Allschwil, Switzerland

[22] Filed: Nov. 25, 1974

[21] Appl. No.: 526,737

Related U.S. Application Data

[63] Continuation-in-part of Ser. No. 392,517, Aug. 29, 1973, Pat. No. 3,895,853.

[30] Foreign Application Priority Data

Nov. 29, 1973 Germany.......................... 2359429

[52] U.S. Cl............................ 339/228; 339/256 R
[51] Int. Cl.²......................................... H01R 11/22
[58] Field of Search .......................... 339/224–240, 339/95 B, 256, 258

[56] References Cited
UNITED STATES PATENTS

| | | | |
|---|---|---|---|
| 1,759,043 | 5/1930 | Derby | 339/230 R |
| 2,675,532 | 4/1959 | Quick | 339/232 X |
| 3,453,587 | 7/1969 | Neidecker | 339/256 |
| 3,861,776 | 1/1975 | Deal | 339/256 R X |

*Primary Examiner*—Roy Lake
*Assistant Examiner*—Paul A. Bell
*Attorney, Agent, or Firm*—Karl F. Ross; Herbert Dubno

[57] ABSTRACT

A battery terminal is provided with a connector pin over which is engaged a sleeve formed of berrylium-bronze and mounted via deformable lugs on the end of a conductor cable. The sleeve is provided internally with a contact band comprising a pair of corrugated side portions between which extend a plurality of tongues extending transverse to these side portions so that these tongues are compressed between the outside of the pin and the inside of the sleeve, thereby forming a good electrical connection. The outside of the sleeve is provided with a synthetic-resin insulating layer and the end thereof may be closed or opened.

9 Claims, 4 Drawing Figures

SNAP-TYPE CONNECTOR FOR BATTERY TERMINAL

CROSS REFERENCE TO RELATED APPLICATIONS

This application is a continuation-in-part of my co-pending patent application Ser. No. 392,517 filed on Aug. 29, 1973 (now U.S. Pat. No. 3,895,853) with reference to the then co-pending and commonly assigned patent applications Ser. Nos. 335,715 (now U.S. Pat. No. 3,854,451) and 336,033 (now U.S. Pat. No. 3,828,301).

FIELD OF THE INVENTION

The present invention relates to an arrangement for connecting an electrical conductor to a battery terminal. More particularly this invention concerns an electrical connector mountable on a conductor cable and releasably engageable with the battery terminal.

BACKGROUND OF THE INVENTION

It is known to form an electrical connection between two complementary surfaces with a contact sheet or strip as described in U.S. Pat. No. 3,453,587 issued on July 1, 1969 which is a strip of resilient metal formed with a plurality of parallel slits that subdivide its central region into a plurality of parallel tongues or contact lamellae extending between coplanar side portions. These tongues are twisted to lie at an angle to the plane of the side portions. Such a connector is compressed between the two complementary surfaces, resiliently deforming the lamellae so as to make a very good electrical connection.

One of the factors which influences the electrical resistance offered by such a connector is the force with which the lamellae bear on the surfaces: the greater the force the less the resistance. Another factor is the number of lamellae since each lamella only bears with one edge on one surface and with its other edge on the other surface. A compromise must be made between the two factors since, if the number of tongues or lamellae is increased by decreasing the width of these lamellae, the force which the tongues exert on the surfaces is also decreased as their capacity for elastic deformation is decreased, and vice versa.

This disadvantage was overcome in the above-mentioned patent application Ser. No. 392,517 in a connector wherein the side portions are longitudinally corrugatedly contracted. By this it is meant that these portions have a developed and extended length which is substantially greater than the length of the contracted strips. This effect is achieved according to a feature of this earlier invention by corrugating or wrinkling the side portions.

Hitherto the principal method of connecting a conductor, such as a cable, to a battery terminal has been by means of a so-called clamp or screw connector. Thus the terminal is provided with a connector pin over which a screw-tightenable sleeve is secured. Such an arrangement does form a good electrical connection between the two elements so long as the members fit each other exactly, but has the considerable disadvantage that a screw must be loosened in order to disconnect the two. In addition a screw must be tightened to connect the two securely together so that changing batteries is a lengthy and difficulty operation.

OBJECT OF THE INVENTION

It is therefore an object of the present invention to advance the principles laid down in the above-cited patent application and patents.

Another object is to provide an improved connector for interconnecting a battery and a conductor.

Yet another object is the provision of such an improved electrical connector which allows a conductor cable or the like readily to be attached to a battery terminal without the need of clamping screws and the like and while forming a good electrical connection between the conductor and the terminal.

SUMMARY OF THE INVENTION

These objects are attained according to the present invention in an arrangement of the above-described general type where however there is provided between the connector sleeve and the connector pin a resiliently deformable and conductive contact band formed with a plurality of generally parallel transverse tongues compressed between the pin and the sleeve and forming therebetween an electrical connection. Such an arrangement allows the clamping bolt to be dispensed with yet provides a good contact surface between the interior of the sleeve and the exterior of the pin which may be integral with the battery terminal or screwed thereto. Such a system has proven in practice to be extremely durable, at the same time it provides sufficient current-carrying capacity while being rigidly connected to the battery terminal so as not to shake loose. At the same time the sleeve can be pulled off the terminal or pressed thereover without special tools or equipment so as to allow a battery to be changed rapidly if necessary.

In accordance with further features of this invention the sleeve is formed integrally of a single stamped piece of sheet metal and is formed with a seat flanked by a pair of plastically deformable lugs adapted to be bent over and clamped on the stripped end of a conductor cable. A compression ring may thereafter be fitted around the end of the cable over these lugs to secure the assembly tightly together.

In accordance with yet another feature of this invention the pin is either integrally formed with the battery or is a supplementary element formed on one end with the pin and on the other end as a self-tapping screw adapted to be screwed into a corresponding hole into the battery terminal.

The sleeve portion of the connector according to yet another feature of this invention is provided externally with an insulating sleeve.

The sleeve according to this invention can be deep-drawn and formed with an inwardly projecting ridge that is adapted to engage in a corresponding groove formed in the terminal pin so as to secure the two elements snugly together. This ridge also prevents the contact band from pulling out of the sleeve when the latter is pulled off the terminal post.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
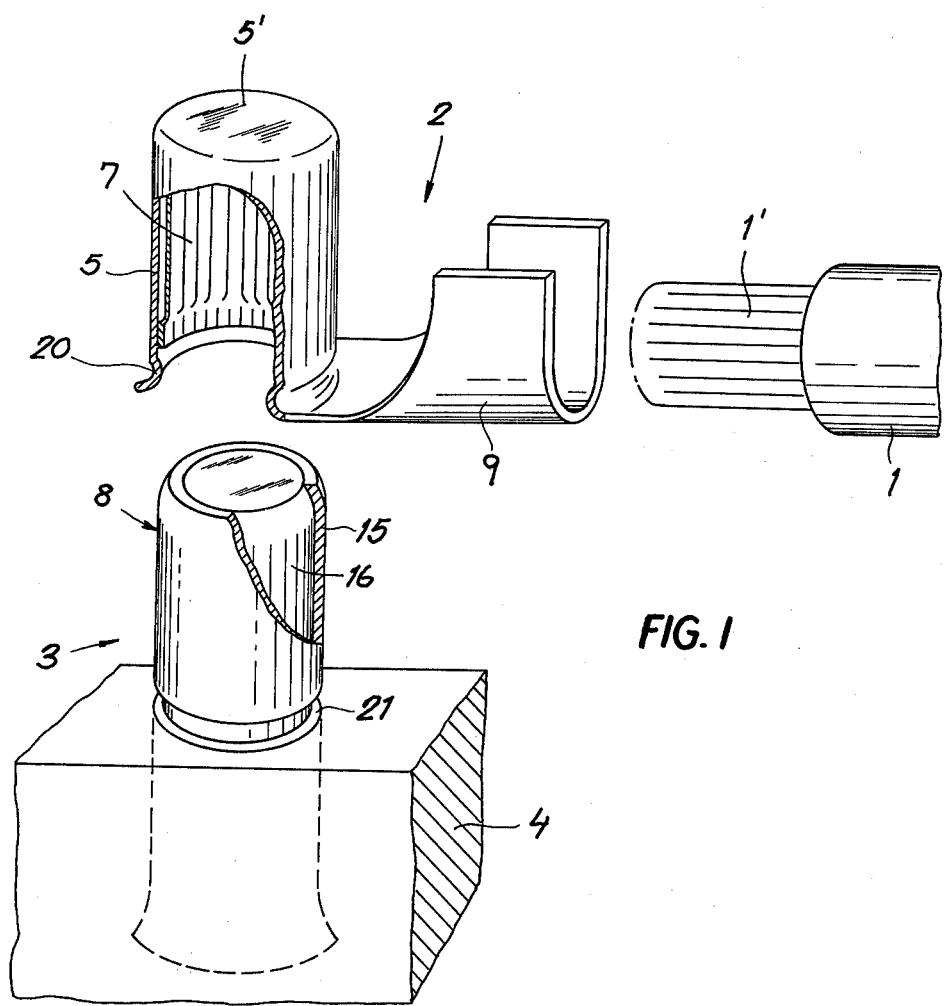
FIG. 1 is a perspective view partly in section illustrating a connector according to the present invention.

As shown in FIG. 1 a connector 2 according to the present invention serves to electrically interconnect a wire 1 having a stripped conductor end 1' to a terminal 3 of a battery indicated at 4. The connector 2 principally comprises a sleeve 5 having a closed upper end 5', the sleeve 5 being formed by deep drawing. Within the sleeve 5 there is provided a conductor band 7 described in greater detail below and having a plurality of resilient tongues 6 adapted to engage between the outside of the terminal 3 and the inside of sleeve 5.

In the embodiment shown in FIG. 1 the terminal 3 is a pin 8 comprising a lead core 16 connected directly to the internal structure of the battery and provided on its outside with a conductor sleeve 15 of copper forming a circumferential outwardly open groove 21 at the base of the pin adjacent the battery 4. The connector 2 is formed with an inwardly projecting ridge 20 adapted to engage in the groove 21 so as to secure the connector 2 snap-fashion on the pin 3. In addition the connector 2 is formed with a pair of lugs 9 adapted to be bent tightly over the strip end 1' of the conductor cable 1 so as to form a secure electrical connection therewith. The connector 1 is made of a copper alloy.

Figure 3:
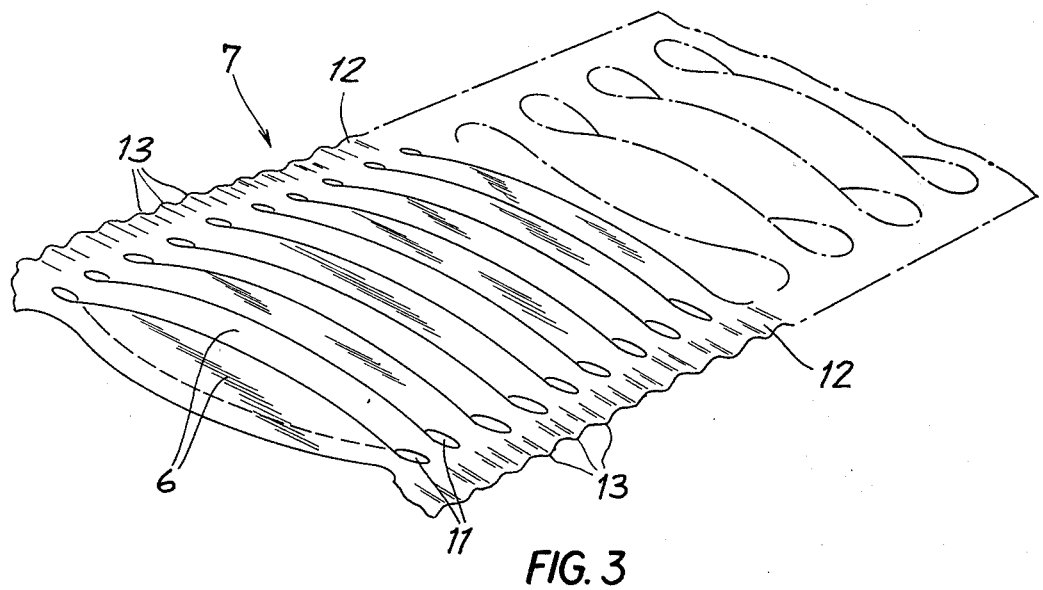
FIGS. 3 and 4 are perspective views of two types of contact bands in accordance with this invention.

As described in my above-cited copending patent application Ser. No. 392,517 the connector strip 7 according to the present invention as shown in FIG. 3 comprises a pair of longitudinally corrugated side portions 12 formed with transverse corrugations 13 and joined together by the tongues 6 which are wider at their middle regions than towards their ends. Slots 11 of dumbbell shape in a noncontractive state are formed in the original metal strip to give the tongues 6 a widened waist. The tongues 6 are also twisted about their longitudinally axes, that is transverse to the longitudinal direction of the strip 7 in a flattened condition, which is the direction of contraction of the side portions 12.

Figure 4:
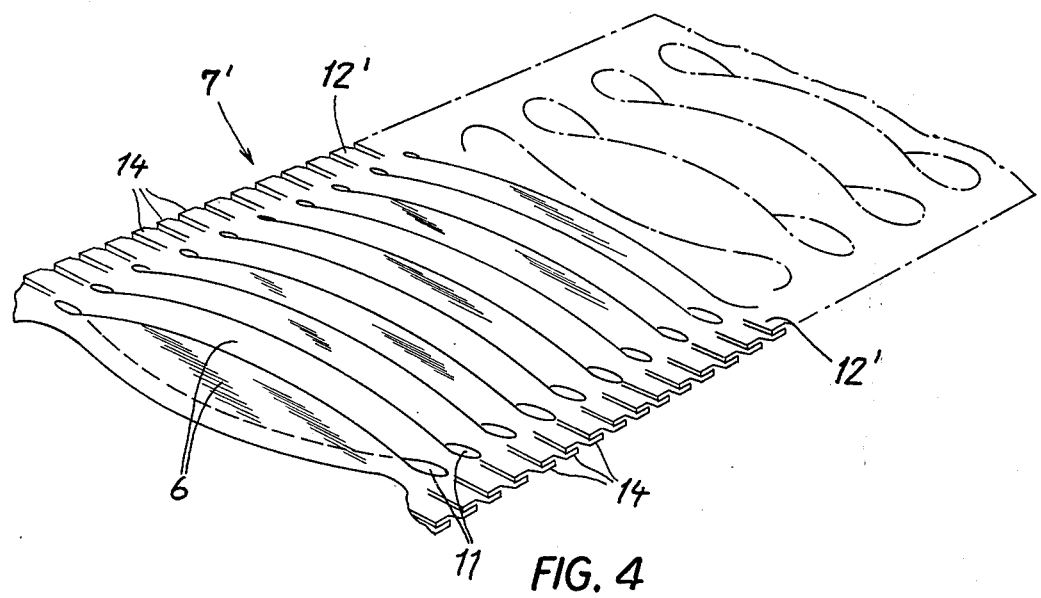

FIG. 4 shows a strip 7' having side portions 12' formed as a succession of overlapping loops 14 which are formed by crimping or wrinkling the side portions as shown in FIG. 3, then flattening the corrugations in one direction while preventing the strip 7' from extending. This gives the strip 7' a fixed length. The extent of overlap of the loops 14 determines the extent of contraction. In FIG. 3 the determining factor is the height of crests of the corrugations 13. In both cases it is easy to produce a connector strip of almost any desired conductivity. Berrylium-bronze is used as the resilient metallic material to form these strips 7 and 7'.

Figure 2:
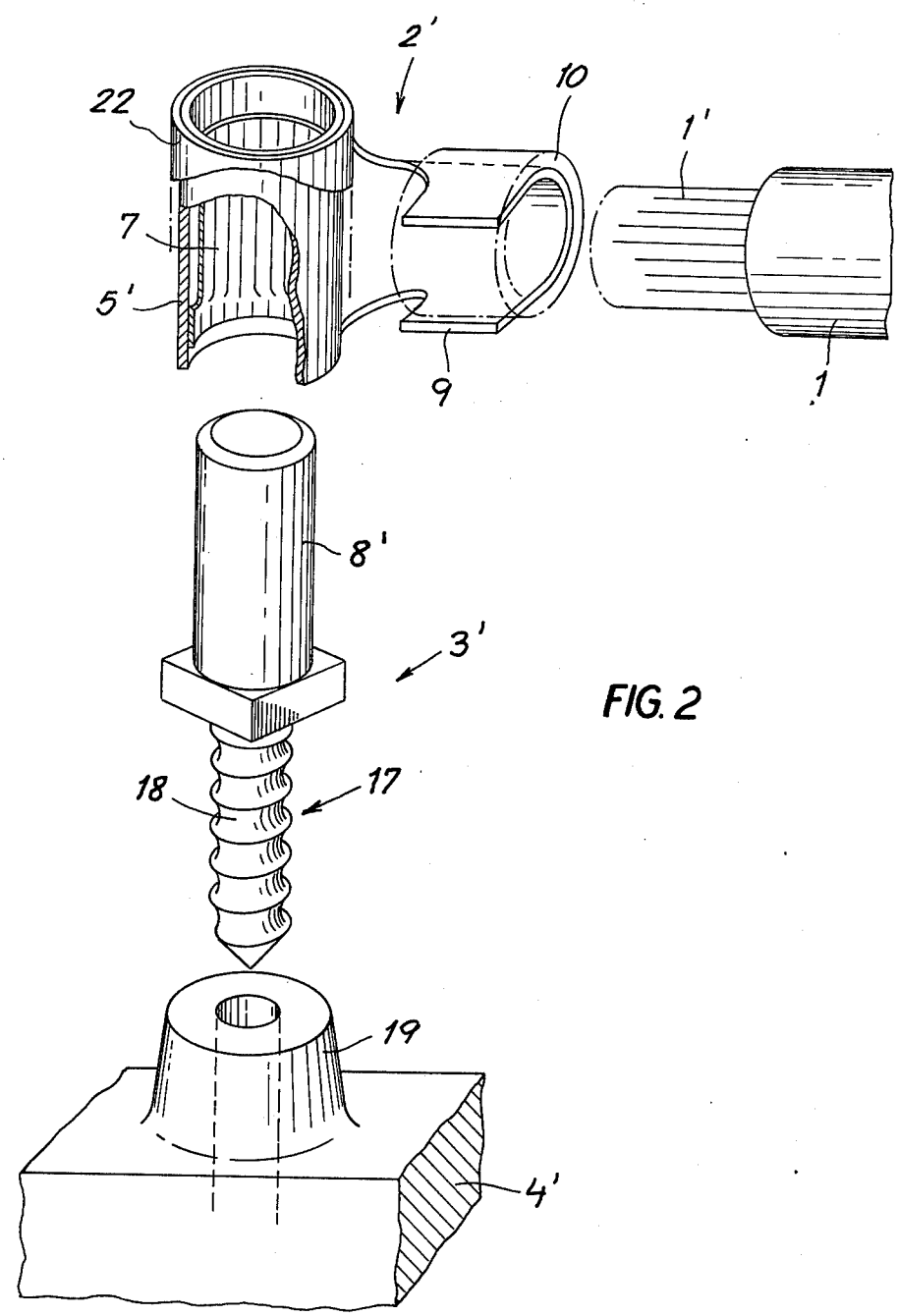
FIG. 2 is an exploded view of another connector in perspective partly sectional view.

The arrangement shown in FIG. 2 is similar to that of FIG. 1 except that here the connector 2' is formed of a single flat piece of metal with the tube 5' being rolled out of the metal and being surrounded externally by an insulating synthetic-resin sleeve 22 that prevents corrosion buildup on the battery terminal. Here the terminal 3' of a battery 4' comprises a pin 8' having a lower threaded end 17 formed with a self-tapping screw thread 18 of the wood-screw type adapted to screw into a corresponding hole in a lead battery terminal 19. The cylindrical upper portion of the pin 8' is received within the sleeve 5' much as disclosed with reference to FIG. 1. Here a sleeve 10 is adapted to be slid over the lugs 9 after they are bent tight around the strip end 1' of the connector cable 1. A connector 2' is again made out of hardened berrylium-bronze.

I claim:

1. An electrical connector for interconnecting a conductor and a battery terminal, said connector comprising a connector pin on said terminal, a connector sleeve on said conductor engageable over said pin, and a resiliently deformable and conductive contact band lying between said pin and said sleeve and formed with a plurality of generally parallel transverse tongues compressed between said pin and said sleeve, said band comprising a generally flat conductive metal sheet having a pair of generally parallel longitudinally extending and longitudinally corrugated contracted side portions having extended lengths which exceed the length of said sheet along said side portions with said plurality of parallel transverse resilient tongues extending between said portions and twisted from the longitudinal directions of said portions, said tongues having ends joined to said side portions and middle regions wider than said ends, said side portions having at least one corrugation per tongue.

2. The connector defined in claim 1 wherein said contact band is formed of a hardened berrylium-bronze alloy.

3. The connector defined in claim 1, further comprising means on said sleeve for connecting same to said conductor.

4. The connector defined in claim 3 wherein said means comprises a pair of plastically deformable lugs and a seat between said lugs, said conductor receivable between said lugs in said seat and said lugs bendable down over said conductor to secure same in said seat.

5. The connector defined in claim 3 wherein said sleeve has a closed end.

6. The connector defined in claim 3 wherein said sleeve is open at both ends.

7. The connector defined in claim 3 wherein said sleeve is provided with insulating cover.

8. The connector defined in claim 3 wherein said pin is provided with a screw portion having a screw thread and adapted to be screwed into said terminal.

9. The connector defined in claim 3 wherein said sleeve is formed with an inwardly directed ridge and said pin is formed with an outwardly open groove, said ridge being resiliently engageable in said groove.

* * * * *